United States Patent
Lapassat et al.

(10) Patent No.: US 10,110,145 B2
(45) Date of Patent: Oct. 23, 2018

(54) DC TO AC CONVERTER

(71) Applicant: GE Energy Power Conversion UK Limited, Rugby (GB)

(72) Inventors: Nicolas Lapassat, Villebon-sur-Yvette (FR); Stéphane Quiniou, Villebon-sur-Yvette (FR)

(73) Assignee: GE ENERGY POWER CONVERSION TECHNOLOGY GMBH, Rugby (GB)

( * ) Notice: Subject to any disclaimer, the term of this patent is extended or adjusted under 35 U.S.C. 154(b) by 0 days.

(21) Appl. No.: 15/843,988

(22) Filed: Dec. 15, 2017

(65) Prior Publication Data

US 2018/0175742 A1    Jun. 21, 2018

(30) Foreign Application Priority Data

Dec. 16, 2016    (FR) ...................................... 16 62617

(51) Int. Cl.
    *H02J 3/36*    (2006.01)
    *H02J 1/10*    (2006.01)
    (Continued)

(52) U.S. Cl.
    CPC .................................. *H02M 7/537* (2013.01)

(58) Field of Classification Search
    CPC ... H02M 2001/0074; H02M 2001/008; H02M 7/5387

(Continued)

(56) References Cited

U.S. PATENT DOCUMENTS 5,138,544 A    8/1992    Jessee
7,292,460 B2   11/2007   Barbosa et al.
                (Continued)

FOREIGN PATENT DOCUMENTS

DE     44 41 758 A1    5/1996
EP     2 525 484 A1   11/2012

OTHER PUBLICATIONS

Wuest, D., et al., "A Comparison of Different Circuit Configurations for an Advanced Static Var Compensator (ASVC)," 23rd Annual IEEE Power Electronics Specialists Conference, pp. 521-529 (Jun. 29-Jul. 3, 1992).

(Continued)

*Primary Examiner* — Gary Nash
(74) *Attorney, Agent, or Firm* — GE Global Patent Operation; Scott R. Stanley

(57) ABSTRACT

A DC-to-AC converter including six phase modules and two capacitors, a transformer with a three-phase primary winding and with two three phase secondary windings, each phase module receiving a DC voltage from a DC voltage bus and capable of transmitting an AC current, and including a transistor, able to modulate the output voltage according to five intensity levels, the first capacitance connected between the positive portion and the midpoint of the DC voltage bus, the second capacitance connected between the negative portion and the midpoint of the DC voltage bus, the first, second and third phase module are linked by their output to a different phase of the first secondary winding. The fourth, fifth and sixth phase module are each linked by their output to a different phase of the second secondary winding of the transformer, the primary winding of the transformer is linked to an electrical power supply network.

9 Claims, 5 Drawing Sheets

(51) Int. Cl.
*H02M 7/48* (2007.01)
*H02M 7/537* (2006.01)

(58) Field of Classification Search
USPC .................................. 363/34–36, 65, 71
See application file for complete search history.

(56) References Cited

U.S. PATENT DOCUMENTS

| | | |
|---|---|---|
| 7,330,363 B2 | 2/2008 | Ponnaluri et al. |
| 8,467,207 B2 | 6/2013 | Costan et al. |
| 2011/0050173 A1* | 3/2011 | King ................ H02J 1/10 320/128 |
| 2013/0044526 A1 | 2/2013 | Soua |
| 2013/0128629 A1* | 5/2013 | Clare ................ H02J 3/36 363/35 |
| 2013/0301325 A1* | 11/2013 | Jakob ................ H02M 7/487 363/131 |
| 2014/0211520 A1* | 7/2014 | Zhang ................ H02M 1/126 363/37 |
| 2014/0218993 A1* | 8/2014 | Permuy ................ H02M 1/088 363/131 |

OTHER PUBLICATIONS

Preliminary Search Report and Written Opinion issued in connection with corresponding FR Application No. 1662617 dated Aug. 18, 2017.

Extended European Search Report and Opinion issued in connection with corresponding EP Application No. 17207459.3 dated Apr. 20, 2018.

* cited by examiner

DC TO AC CONVERTER

BRIEF SUMMARY OF THE INVENTION

The field of the invention is that of power conversion and, more particularly, DC-to-AC conversion.

Electronic power converters that are connected to an electrical power supply network must comply with network standards requiring a specific harmonic content, both in terms of level and of frequency.

In order to observe harmonic injection levels, two main options are possible and may be combined: using a sinusoidal filter or filters for specific harmonics; or improving the waveforms of the currents and voltages output by the converter by increasing the number of voltage levels.

However, each of these two solutions has drawbacks.

The drawback relating to the filters is mainly due to the bulk thereof and to the requirement to match them with the impedance of the network, which is a potentially variable datum. While it is difficult to modify values of physical components forming a filter once they have already been defined and installed, it is much easier to modify parameters in a digital control system in order to account for potential variations in the network. Multilevel converters make it possible to decrease the size of the filters or to do away with them altogether in the majority of cases, at the cost of an increase in output distortion.

Two main techniques may be employed in order to obtain multilevel converters that make it possible to limit output distortion, such as converters with more than nine levels: cells connected in series, for example an MMC (modular multilevel converter); and using a large number of lower-voltage power converters, connected in parallel through interphase inductors, and the commands for which are phase-shifted.

The use of cells connected in series is however not really suitable for the power range extending from several tens of kVA to several tens of MVA and a network voltage at the point of connection of higher than 100 kV.

The use of a large number of lower-voltage power converters may be complex and expensive to implement and require expensive transformers, or connection to a voltage step-up transformer through interphase converters, which lead to additional expense and bulk.

BRIEF DESCRIPTION OF THE INVENTION

There exists a need for a DC-to-AC power converter that solves the above-mentioned problems.

One aspect of the invention is a DC-to-AC converter provided with a set of components comprising at least six phase modules and two capacitors, which is connected to a transformer provided with a three-phase primary winding and with at least two secondary windings, each with three phases, each phase module receiving, over its inputs, a DC voltage arising from a DC voltage bus and capable of transmitting, as output, an AC current, each phase module being provided with at least one transistor, the control of which makes it possible to modulate the output voltage according to five voltage levels, the first capacitance being connected between the positive portion of the DC voltage bus and the midpoint of the DC voltage bus, the second capacitance being connected between the negative portion of the DC voltage bus and the midpoint of the DC voltage bus, the first phase module, the second phase module and the third phase module are each linked by their output to a different phase of the first secondary winding of the transformer, the fourth phase module, the fifth phase module and the sixth phase module are each linked by their output to a different phase of the second secondary winding of the transformer, the primary winding of the transformer being linked to an electrical power supply network.

Each phase module may comprise a first input that is linked to the positive portion of the DC voltage bus, a second input that is linked to the negative portion of the DC voltage bus, and a third input that is linked to the midpoint of the DC voltage bus, each phase module also comprises a first transistor that is connected to the first input by its collector, the emitter of the first transistor being connected to the collector of a second transistor, the emitter of the second transistor being linked to the output, a third transistor is connected by its emitter to the second input, the collector of the third transistor being connected to the emitter of a fourth transistor, the collector of the fourth transistor is connected to the output, a fifth transistor is connected by its collector to the third input, the emitter of the fifth transistor (T5) being connected to the emitter of a sixth transistor, the collector of the sixth transistor being linked to the collector of a seventh transistor, the emitter of the seventh transistor is linked to the emitter of an eighth transistor, the collector of the eighth transistor being linked to the output, a first plate of a first filtering capacitor is connected between the emitter of the first transistor and the collector of the second transistor, the second plate being connected between the collector of the sixth transistor and the collector of the seventh transistor, a first plate of a second filtering capacitor is connected between the emitter of the fourth transistor and the collector of the third transistor, and the second plate being connected between the collector of the sixth transistor and the collector of the seventh transistor, flyback diodes being connected in parallel to each transistor, their cathode being connected to the collector of the transistor and their anode to the emitter of the transistor.

The DC-to-AC converter may comprise another set of components comprising six phase modules that are arranged around a second DC voltage bus and are each connected to a different phase of two other windings of the transformer, the other set of components having a structure that is similar to that of the set of components that is connected to the two windings of the transformer.

The midpoint of a voltage bus may be linked to ground via a high-value capacitance.

The positive portion and the negative portion of the DC voltage bus may be connected unidirectionally or bidirectionally to a DC electrical energy production device and/or to a DC electrical energy storage device.

The positive portion, the negative portion and the midpoint of the DC voltage bus may be connected unidirectionally or bidirectionally to a DC electrical energy production device and/or to a DC electrical energy storage device.

The DC voltage bus may be left floating such that the DC-to-AC converter is capable of compensating for the reactive power of the electrical power supply network.

Another aspect of the invention is a method for controlling a DC-to-AC converter comprising the following steps: the phase modules are controlled by switching according to a mixed switching pattern comprising for the phase modules that are connected to each secondary winding of the transformer, a sawtooth AC carrier signal associated with the positive polarities and a sawtooth carrier signal associated with the negative polarities of the phase modules that are connected to each secondary winding, for each winding, the carrier signal associated with the positive polarities is in phase with the corresponding carrier signal for the negative polarities the carrier signals associated with a winding are in phase quadrature with the carrier signals associated with another winding.

The converter has the nonlimiting advantage of not requiring a filter for the majority of applications, or in certain particular cases requiring decreased filtering, by virtue of the nine output voltage levels.

When the DC-to-AC converter comprises phase modules that are distributed over two DC voltage buses, the carrier signals of the phase modules that are connected to the second DC voltage bus may be phase-shifted by 45° with respect to the carrier signals of the phase modules that are connected to the first DC voltage bus.

By way of example, a switching frequency of 1 kHz for the sawtooth carrier signal, a switching frequency that is equivalent to 2 kHz is obtained at the output of each phase module and a frequency of 4 kHz at the primary winding of the transformer. This corresponds to a rank of eighty for an electrical power supply network at 50 Hz.

The high switching frequency also helps to mitigate the risks associated with characterizing the network impedance and its variation with time.

Additionally, each secondary winding of the transformer is supplied with power by sources having five levels that provide little in the way of harmonics and voltage level stress, thereby making it easier to produce the transformer.

The fact that the phase modules are connected to one and the same DC current bus makes it possible for the DC voltage to be naturally shared and allows the equipment dedicated to the DC voltage bus (discharge, grounding and voltage measurement equipment) to be pooled.

The galvanic isolation of the secondary windings prevents any current flow between the phase modules such that it is not necessary to add homopolar inductance.

The common DC power supply bus makes it possible to design a system comprising a low voltage between the midpoint of the DC voltage bus and ground, thereby decreasing the insulation voltage stress on the phase modules.

BRIEF DESCRIPTION OF THE DRAWINGS

Other aims, features and advantages of the invention will become apparent upon reading the following description provided solely by way of non-limiting example and with reference to the appended drawings, in which:

FIG. 1 shows a phase module A comprising a first input denoted by DC+, a second input denoted by DC−, an output denoted by PH and an auxiliary connection denoted by DC0. In operation, a DC voltage arising from a DC voltage bus is applied between the first input DC+ and the second input DC−, and an AC current is emitted by the output PH. The phase module A is linked to a midpoint of the DC voltage bus by the auxiliary connection DC0. The midpoint of the DC voltage bus DC0 may, in an alternative embodiment, be linked to ground via a high-value capacitance, for example of several µF.

DETAILED DESCRIPTION

The structure of the phase module A will now be described. A first transistor T1 is connected to the first input DC+ by its collector, the emitter of the first transistor T1 being connected to the collector of a second transistor T2, the emitter of the second transistor T2 being linked to the output PH.

A third transistor T3 is connected by its emitter to the second input DC−, the collector of the third transistor T3 being connected to the emitter of a fourth transistor T4. The collector of the fourth transistor T4 is connected to the output PH.

A fifth transistor T5 is connected by its collector to the third input DC0, the emitter of the fifth transistor T5 being connected to the emitter of a sixth transistor T6, the collector of the sixth transistor T6 being linked to the collector of a seventh transistor T7.

The emitter of the seventh transistor T7 is linked to the emitter of an eighth transistor T8, the collector of the eighth transistor T8 being linked to the output PH.

A first filtering capacitor Cf1 is connected by a first plate between the emitter of the first transistor T1 and the collector of the second transistor T2, and by its second plate between the collector of the sixth transistor T6 and the collector of the seventh transistor T7.

A second filtering capacitor Cf2 is connected by a first plate between the emitter of the fourth transistor T4 and the collector of the third transistor T3, and by its second plate between the collector of the sixth transistor T6 and the collector of the seventh transistor T7.

Flyback diodes D1, D2, D3, D4, D5, D6, D7, D8 are connected in parallel to each transistor T1, T2, T3, T4, T5, T6, T7, T8, their cathode being connected to the collector and their anode to the emitter.

It should be noted that the transformers T2, T4, T7 and T8 form an inverter, referred to as the internal inverter, denoted by OI.

The transformers T1, T3, T5 and T6 form an inverter, referred to as the external inverter, denoted by OE.

Figure 2:
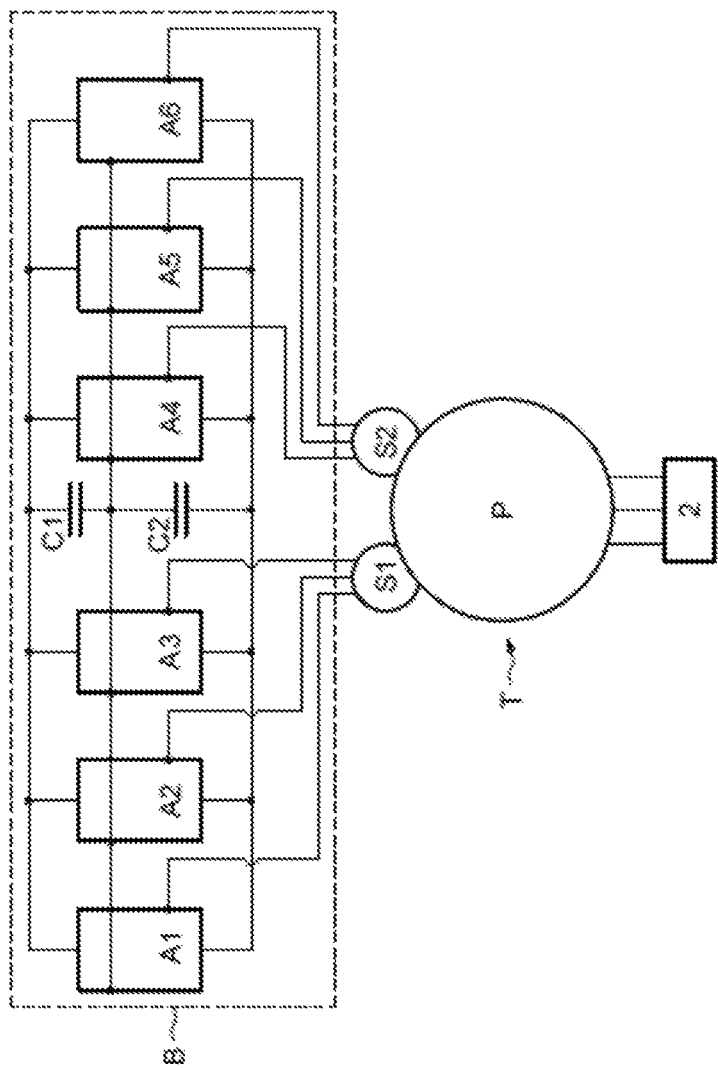
FIG. 2 illustrates the main elements of a DC-to-AC converter.

FIG. 2 shows a DC-to-AC converter denoted by B comprising six phase modules A such as described above, denoted by A1 to A6, and a transformer T comprising a three-phase primary winding and two secondary windings each with three phases, the primary and secondary windings being galvanically isolated.

Each phase module is connected by its first input DC+ to the positive portion of the DC voltage bus, by its second input DC− to the negative portion of the DC voltage bus and by its third input DC0 to the midpoint of the DC voltage bus.

A first capacitance C1 is connected between the positive portion of the DC voltage bus and the midpoint of the DC voltage bus. A second capacitance C2 is connected between the negative portion of the DC voltage bus and the midpoint of the DC voltage bus. The phase modules thus share the same voltage references.

The first phase module A1, the second phase module A2 and the third phase module A3 are each linked by their output PH to a different phase of a first secondary winding S1 of the transformer T.

The fourth phase module A4, the fifth phase module A5 and the sixth phase module A6 are each linked by their output PH to a different phase of a second secondary winding S2 of the transformer T.

The primary winding P of the transformer is linked to an electrical power supply network 2.

The six phase modules are controlled by switching according to a mixed switching pattern making it possible to obtain nine voltage levels at the primary winding of the transformer. The switching pattern is described below with reference to FIG. 4.

The transformer T provides a voltage increase in order to arrive at the voltage level of the electrical power supply network. The current at the fundamental frequency is regulated by the difference in voltage between the electrical power supply network and the voltage of the secondary windings through the leakage inductance of the transformer.

Current ripple at each secondary winding is limited by virtue of the leakage inductance of the transformer.

Figure 3:
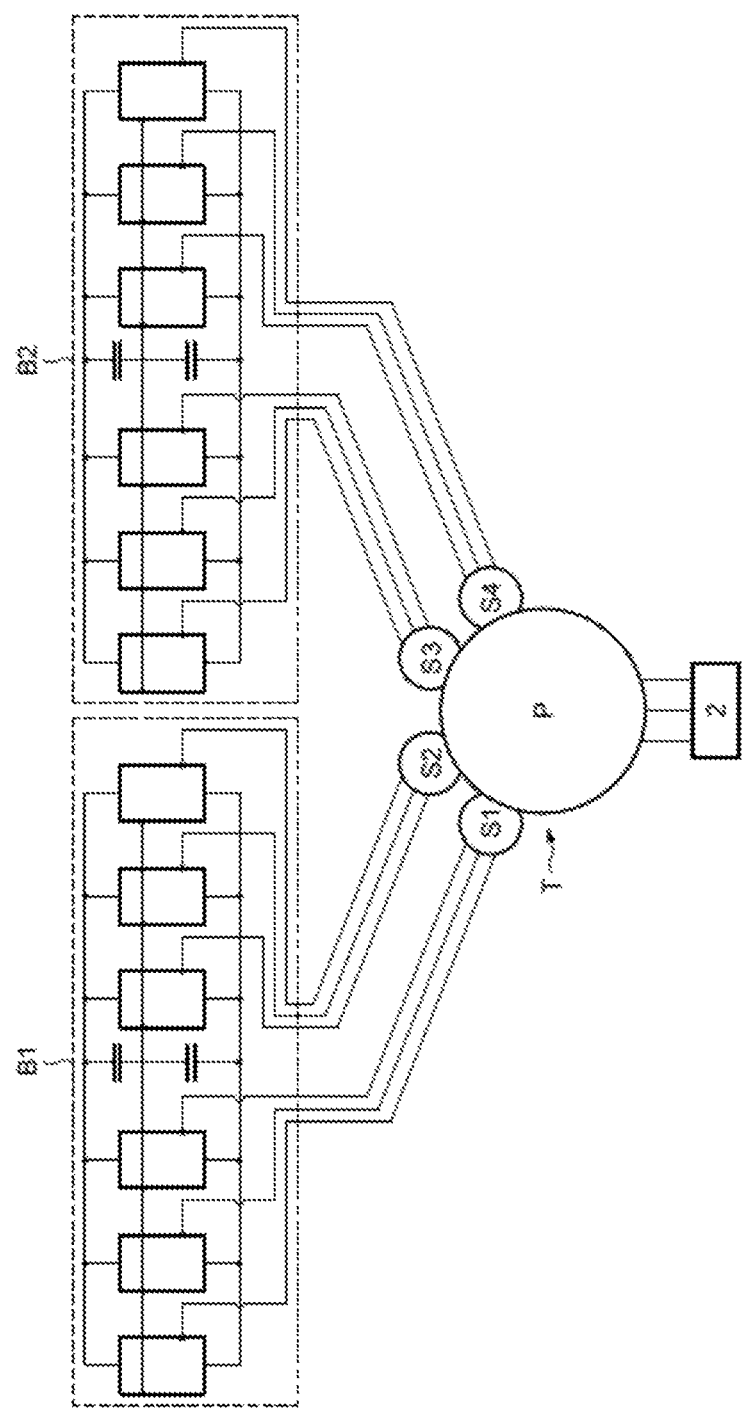
FIG. 3 illustrates the main elements of another embodiment of a DC-to-AC converter.

FIG. 3 illustrates another embodiment of a DC-to-AC converter comprising twelve phase modules that are each connected to a different phase of four secondary windings S1, S2, S3, S4 of a transformer T. Six phase modules are arranged around a first DC voltage bus, six other phase modules being arranged around a second DC voltage bus in a manner akin to the arrangement described in FIG. 2. The primary winding of the transformer is linked to an electrical power supply network 2. Such an embodiment makes it possible to combine two separate DC voltage buses.

Each phase module is controlled by a least one control signal arising from the intersection of a sawtooth carrier signal and a sinusoidal modulating signal.

Figure 1:
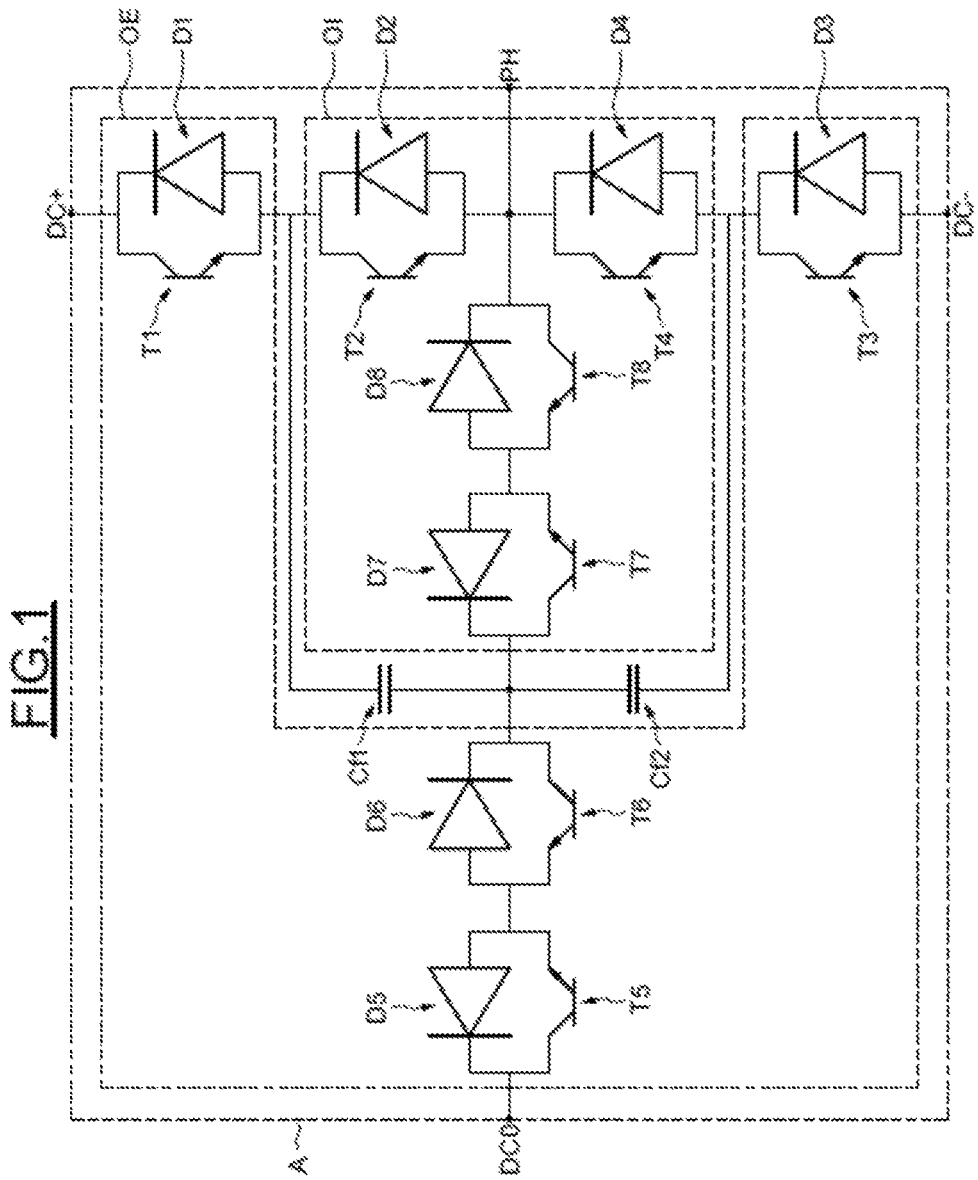
FIG. 1 illustrates the main elements of a phase module.
Figure 4:
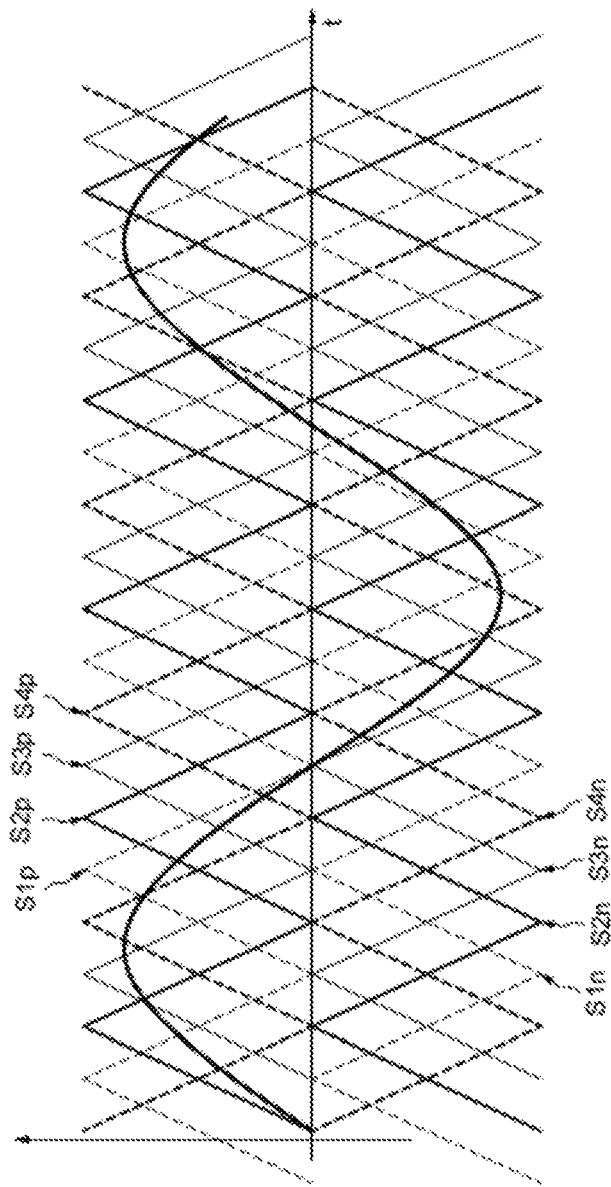
FIG. 4 illustrates the carrier signals for controlling the phase modules.

FIG. 4 illustrates the carrier signals of the phase modules of the DC-to-AC converter according to FIGS. 1 and 2, and the form of the reference sinusoidal voltage.

In the embodiment illustrated by FIG. 2, the sinusoidal modulating signal is common to the phase modules A1, A2, A3, A4, A5, A6.

In the embodiment illustrated by FIG. 3, the sinusoidal modulating signal is common to the groups of phase modules B1 and B2. The sawtooth carrier signals are phase-shifted, thereby generating control signals for the different transistors. In practice, they deliver the same voltage in the low frequency spectrum (operating frequency, that of the network and of its low-order harmonics). However, their voltages are different in the high frequency domain (frequency of the sawtooth).

FIG. 4 shows a first pair of sawtooth carrier signals, comprising two signals that are in phase, one denoted by S1$p$, that is amplitude-shifted so as to be positive, the other, denoted by S1$n$, being amplitude-shifted so as to be negative. This first pair S1$n$, S1$p$ of carrier signals is associated with the transistors of the internal inverter OE. A second pair of sawtooth signals S2$n$, S2$p$, in phase opposition with the first pair of signals and obtained in a similar manner, is associated with the transistors of the internal inverter OI. An AC voltage with five levels is thus obtained at the output of each converter.

Additionally, it may be seen that the carrier signals of the set of phase modules that are associated with the second secondary winding are in phase quadrature (phase-shifted by 90°) with respect to the corresponding carrier signals of the set of phase modules that are associated with the first secondary winding.

A voltage with five levels is thus obtained at the output of each set of phase modules that are associated with a secondary winding and a voltage with nine levels at the output of the primary winding of the transformer.

More particularly, four sawtooth carrier signals denoted by S1$p$, S2$p$, S3$p$, S4$p$ for the positive occurrences and four sawtooth carrier signals denoted by S1$n$, S2$n$, S3$n$, S4$n$ for the negative occurrences, may be seen in FIG. 4. The carrier signals are applied differently to the phase modules that are illustrated in FIG. 2 and to the internal and external inverters of these phase modules that are illustrated in FIG. 1.

The control signals carried by the carrier signal S1$p$ and the carrier signal S1$n$ are applied to the internal inverters of the phase modules A1, A2, A3 that are associated with the first secondary winding.

The control signals carried by the carrier signal S2$p$ and the carrier signal S2$n$ are applied to the internal inverters of the phase modules A4, A5, A6 that are associated with the second secondary winding.

The control signals carried by the carrier signal S3$p$ and the carrier signal S3$n$ are applied to the external inverters of the phase modules A1, A2, A3 that are associated with the first secondary winding.

The control signals carried by the carrier signal S4$p$ and the carrier signal S4$n$ are applied to the external inverters of the phase modules A4, A5, A6 that are associated with the second secondary winding.

Figure 5:
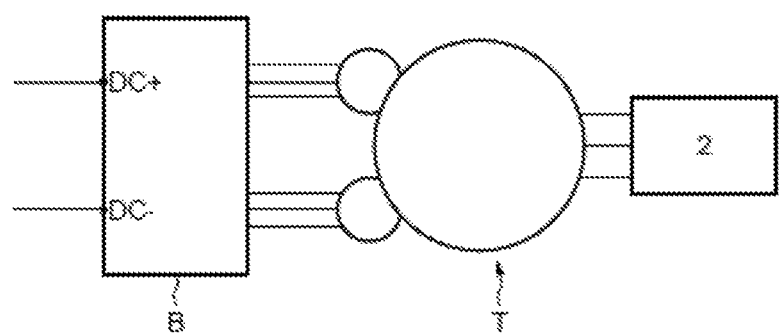
FIG. 5 illustrates a first mode of connection of a DC-to-AC converter.
Figure 6:
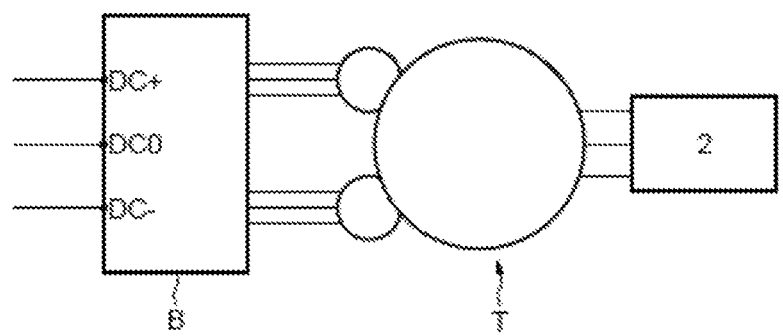
FIG. 6 illustrates a second mode of connection of a DC-to-AC converter.

As may be seen in FIGS. 5 and 6, a DC-to-AC converter A may be connected unidirectionally or bidirectionally to a DC electrical energy production (photovoltaic or wind power installations) or storage (battery, flywheel or PSPS, for pumped storage power station, also known as pumped hydroelectric energy storage) device via a DC voltage bus (DC+, DC−) and to the electrical power supply network 2. In one alternative embodiment, the connection also comprises a midpoint DC0 connection. The DC-to-AC converter A makes it possible to convert DC power to AC power, and to match the voltage to the level of the electrical power supply network, while observing the standards for injection onto such a network.

Figure 7:
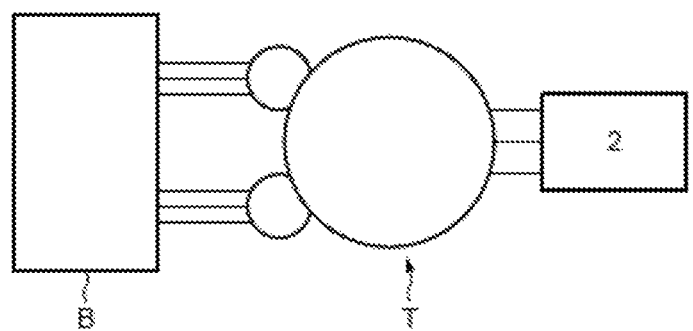
FIG. 7 illustrates a third mode of connection of a DC-to-AC converter.

FIG. 7 illustrates the DC-to-AC converter A employed as means for compensating for reactive power (STATCOM, for static synchronous compensator). In such an embodiment, the DC-to-AC converter A is solely connected to the electrical power supply network 2. Only the active power allowing the voltage of the DC bus to be maintained is absorbed over the network. The DC-to-AC converter A makes it possible to decrease the variations in voltage of the electrical power supply network by injecting a reactive current, as well as to improve its power factor.

A DC-to-AC converter A employed as means for compensating for reactive power delivers reactive energy to the electrical power supply network 2 in order to bolster it when the voltage thereof is low in order to bring it up to the predefined voltage. Conversely, the converter absorbs reactive energy from the electrical power supply network 2 when the voltage of the network is high in order to bring it down to the predefined voltage.

In a similar mode of operation, the DC-to-AC converter A employed as means for compensating for reactive power may also deliver or absorb reactive power in order to keep the power factor of the electrical power supply network at a predefined value.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A DC-to-AC converter, provided with a set of components comprising:
   at least six phase modules and two capacitors connected to a transformer provided with a three-phase primary winding and with at least two secondary windings, each with three phases,
   each phase module receiving, over its inputs, a DC voltage arising from a DC voltage bus and capable of transmitting, as output, an AC current,
   each phase module being provided with at least one transistor, the control of which makes it possible to modulate the output voltage according to five voltage levels,
   a first capacitance of the two capacitors being connected between the positive portion of the DC voltage bus and the midpoint of the DC voltage bus, a second capacitance of the two capacitors being connected between the negative portion of the DC voltage bus and the midpoint of the DC voltage bus,
   the first phase module, the second phase module, and the third phase module are each linked by their output to a different phase of the first secondary winding of the transformer,
   the fourth phase module, the fifth phase module, and the sixth phase module are each linked by their output to a different phase of the second secondary winding of the transformer,
   the primary winding of the transformer is linked to an electrical power supply network.

2. The DC-to-AC converter according to claim 1, wherein each phase module comprises a first input that is linked to the positive portion of the DC voltage bus, a second input that is linked to the negative portion of the DC voltage bus, and a third input that is linked to the midpoint of the DC voltage bus,
   each phase module also comprises a first transistor that is connected to the first input by its collector, the emitter of the first transistor being connected to the collector of a second transistor, the emitter of the second transistor being linked to the output,
   a third transistor is connected by its emitter to the second input, the collector of the third transistor being connected to the emitter of a fourth transistor, the collector of the fourth transistor is connected to the output,
   a fifth transistor is connected by its collector to the third input, the emitter of the fifth transistor being connected to the emitter of a sixth transistor, the collector of the sixth transistor being linked to the collector of a seventh transistor,
   the emitter of the seventh transistor is linked to the emitter of an eighth transistor, the collector of the eighth transistor being linked to the output,
   a first plate of a first filtering capacitor is connected between the emitter of the first transistor and the collector of the second transistor, the second plate being connected between the collector of the sixth transistor and the collector of the seventh transistor,
   a first plate of a second filtering capacitor is connected between the emitter of the fourth transistor and the collector of the third transistor, and the second plate being connected between the collector of the sixth transistor and the collector of the seventh transistor,
   flyback diodes being connected in parallel to each transistor, their cathode being connected to the collector of the transistor and their anode to the emitter of the transistor.

3. The DC-to-AC converter according to claim 1, further comprising another set of components comprising six phase modules that are arranged around a second DC voltage bus and are each connected to a different phase of two other windings of the transformer, the other set of components having a structure that is similar to that of the set of components that is connected to the two windings of the transformer.

4. The DC-to-AC converter according to claim 1, wherein the midpoint of a voltage bus is linked to ground via a high-value capacitance.

5. The DC-to-AC converter according to claim 1, wherein the positive portion and the negative portion of the DC voltage bus are connected unidirectionally or bidirectionally to a DC electrical energy production device and/or to a DC electrical energy storage device.

6. The DC-to-AC converter according to claim 1, wherein the positive portion, the negative portion and the midpoint of the DC voltage bus are connected unidirectionally or bidirectionally to a DC electrical energy production device and/or to a DC electrical energy storage device.

7. The DC-to-AC converter according to claim 1, wherein the DC voltage bus is left floating such that the DC-to-AC converter is capable of compensating for the reactive power of the electrical power supply network.

8. A method for controlling a DC-to-AC converter according to claim 1, the method comprising:
   controlling the phase modules by switching according to a mixed switching pattern comprising:
      for the phase modules that are connected to each secondary winding of the transformer, a sawtooth AC carrier signal associated with the positive polarities and a sawtooth carrier signal associated with the negative polarities of the phase modules that are connected to each secondary winding,
      for each winding, the carrier signal associated with the positive polarities is in phase with the corresponding carrier signal for the negative polarities, the carrier signals associated with a winding are in phase quadrature with the carrier signals associated with another winding.

9. The method for controlling a DC-to-AC converter according to claim 8, wherein the carrier signals of the phase modules that are connected to the second DC voltage bus are phase-shifted by 45° with respect to the carrier signals of the phase modules that are connected to the first DC voltage bus.

* * * * *